US006961481B2

(12) United States Patent
Lee et al.

(10) Patent No.: US 6,961,481 B2
(45) Date of Patent: Nov. 1, 2005

(54) METHOD AND APPARATUS FOR IMAGE PROCESSING USING SUB-PIXEL DIFFERENCING

(75) Inventors: Harry C. Lee, Maitland, FL (US); Jason Sefcik, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 637 days.

(21) Appl. No.: 10/188,846

(22) Filed: Jul. 5, 2002

(65) Prior Publication Data

US 2004/0005082 A1 Jan. 8, 2004

(51) Int. Cl.[7] .................................................. G06K 9/32
(52) U.S. Cl. ....................... 382/300; 382/294; 382/295; 382/298; 382/103; 345/606
(58) Field of Search ................................ 382/294, 295, 382/298, 299, 300

(56) References Cited

U.S. PATENT DOCUMENTS

| | | | | |
|---|---|---|---|---|
| 4,639,774 A | | 1/1987 | Fried | |
| 4,937,878 A | | 6/1990 | Lo et al. | |
| 5,119,435 A | | 6/1992 | Berkin | |
| 5,452,003 A | | 9/1995 | Chamberlain et al. | |
| 5,500,904 A | | 3/1996 | Markandey et al. | |
| 5,627,635 A | | 5/1997 | Dewan | |
| 5,627,915 A | | 5/1997 | Rosser et al. | |
| 5,680,487 A | | 10/1997 | Markandey | |
| 5,714,745 A | | 2/1998 | Ju et al. | |
| 5,801,678 A | | 9/1998 | Huang et al. | |
| 5,848,190 A | | 12/1998 | Kleehammer et al. | |
| 5,979,763 A | | 11/1999 | Wang et al. | |
| 6,088,394 A | | 7/2000 | Maltby | |
| 6,757,445 B1 | * | 6/2004 | Knopp | 382/285 |
| 6,816,166 B2 | * | 11/2004 | Shimizu et al. | 345/581 |
| 2001/0020950 A1 | * | 9/2001 | Shimizu et al. | 345/611 |
| 2002/0136465 A1 | * | 9/2002 | Nagashima | 382/276 |
| 2002/0186898 A1 | * | 12/2002 | Nagashima et al. | 382/300 |

* cited by examiner

*Primary Examiner*—Andrew W. Johns
*Assistant Examiner*—O'Neal R. Mistry
(74) *Attorney, Agent, or Firm*—Buchanan Ingersoll

(57) ABSTRACT

A method of processing image data is described. The method comprises receiving first image data corresponding to a first image and second image data corresponding to a second image, wherein pixels of the first image data and pixels of the second image data are registered to each other. The method also comprises shifting at least a portion of the first image data by a first fractional pixel displacement and at least a portion of the second image data by a second fractional pixel displacement to generate first shifted data and second shifted data, respectively. The method also comprises interpolating the first shifted data and the second shifted data to generate first interpolated data and second interpolated data, respectively. The method further comprises differencing the first interpolated data and the second interpolated data to generate residue data. An image processing system comprising a memory and a processing unit configured to carry out the above-noted steps is also described. A computer-readable carrier adapted to program a computer to carry out the above-noted steps is also described.

60 Claims, 5 Drawing Sheets

METHOD AND APPARATUS FOR IMAGE PROCESSING USING SUB-PIXEL DIFFERENCING

BACKGROUND

1. Field of the Invention

The present invention relates to image processing. More particularly, the present invention relates to processing multiple frames of image data from a scene.

2. Background Information

Known approaches seek to identify moving objects from background clutter given multiple frames of imagery obtained from a scene. One aspect of known approaches is to align (register) a first image to a second image and to difference the registered image and the second image. The resulting difference image can then be analyzed for moving objects (targets).

The Fried patent (U.S. Pat. No. 4,639,774) discloses a moving target indication system comprising a scanning detector for rapidly scanning a field of view and an electronic apparatus for processing detector signals from a first scan and from a second scan to determine an amount of misalignment between frames of such scans. A corrective signal is generated and applied to an adjustment apparatus to correct the misalignment between frames of imagery to insure that frames of succeeding scans are aligned with frames from previous scans. Frame-to-frame differencing can then be performed on registered images.

The Lo et al. patent (U.S. Pat. No. 4,937,878) discloses an approach for detecting moving objects silhouetted against background clutter. A correlation subsystem is used to register the background of a current image frame with an image frame taken two time periods earlier. A first difference image is generated by subtracting the registered images, and the first difference image is low-pass filtered and thresholded. A second difference image is generated between the current image frame and another image frame taken at a different subsequent time period. The second difference image is likewise filtered and thresholded. The first and second difference images are logically ANDed, and the resulting image is analyzed for candidate moving objects.

The Markandey patent (U.S. Pat. No. 5,680,487) discloses an approach for determining optical flow between first and second images. First and second multi-resolution images are generated from first and second images, respectively, such that each multi-resolution image has a plurality of levels of resolution. A multi-resolution optical flow field is initialized at a first one of the resolution levels. At each resolution level higher than the first resolution level, a residual optical flow field is determined at the higher resolution level. The multi-resolution optical flow field is updated by adding the residual optical flow field. Determining the residual optical flow field comprises the steps of expanding the multi-resolution optical flow field from a lower resolution level to the higher resolution level, generating a registered image at the higher resolution level by registering the first multi-resolution image to the second multi-resolution image at the higher resolution level in response to the multi-resolution optical flow field, and determining an optical flow field between the registered image and the first multi-resolution image at the higher resolution level. The optical flow determination can be based upon brightness, gradient constancy assumptions, and correlation of Fourier transform techniques.

SUMMARY OF THE INVENTION

According to an exemplary aspect of the present invention, there is provided a method of processing image data. The method comprises receiving first image data corresponding to a first image and second image data corresponding to a second image, wherein pixels of the first image data and pixels of the second image data are registered to each other. The method also comprises shifting at least a portion of the first image data by a first fractional pixel displacement to generate first shifted data and at least a portion of the second image data by a second fractional pixel displacement to generate second shifted data, respectively. In addition, the method comprises interpolating the first shifted data and the second shifted data to generate first interpolated data and second interpolated data, respectively. The method further comprises differencing the first interpolated data and the second interpolated data to generate residue data. The method can also comprise identifying target data from the residue data.

In another exemplary aspect of the present invention, an image processing system is provided. The system comprises a memory and a processing unit coupled to the memory wherein the processing unit is configured to execute the above noted steps.

In another exemplary aspect of the present invention, there is provided a computer-readable carrier containing a computer program adapted to program a computer to execute the above-noted steps. In this regard, the computer-readable carrier can be, for example, solid-state memory, magnetic memory such as a magnetic disk, optical memory such as an optical disk, a modulated wave (such as radio frequency, audio frequency or optical frequency modulated waves), or a modulated downloadable bit stream that can be received by a computer via a network or a via a wireless connection.

DETAILED DESCRIPTION

Figure 1:
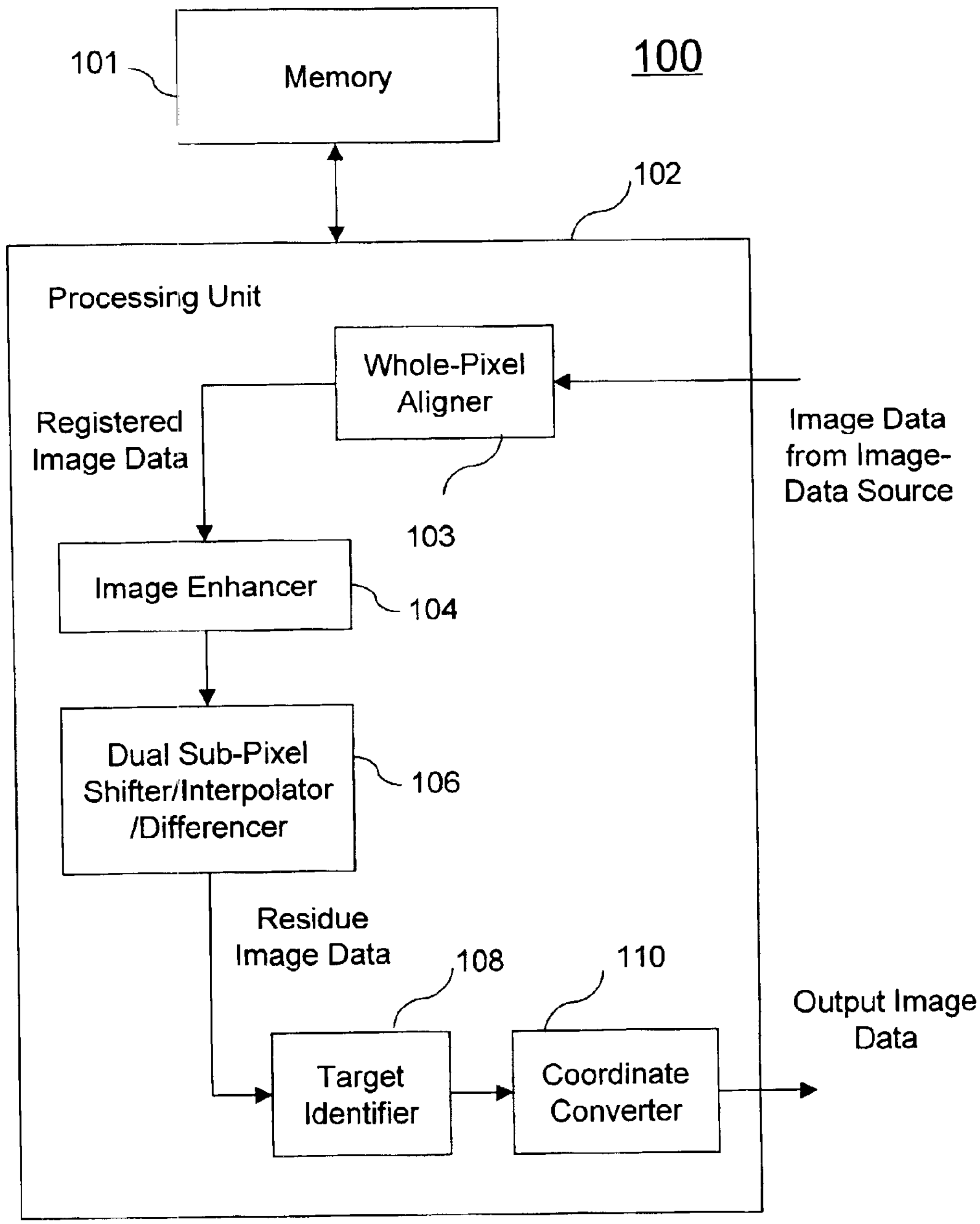
FIG. 1 is an illustration of a functional block diagram of an image processing system according to an exemplary aspect of the invention.

According to one aspect of the invention there is provided an image-processing system. FIG. 1 illustrates a functional block diagram of an exemplary image-processing system 100 according to the present invention. The system 100 includes a memory 101 and a processing unit 102 coupled to the memory, wherein the processing unit is configured to execute the following steps: receiving first image data corresponding to a first image and second image data corresponding to a second image, wherein pixels of the first image data and pixels of the second image data are registered to each other; shifting at least a portion of the first image data by a first fractional pixel displacement and at least a portion of the second image data by a second fractional pixel displacement to generate first shifted data and second shifted data, respectively; interpolating the first shifted data and the second shifted data to generate first interpolated data and second interpolated data, respectively; and differencing the first interpolated data and the second interpolated data to generate residue data. For example, the memory 101 can store a computer program adapted to cause the processing unit 102 to execute the above-noted steps. These steps will be further described with reference to FIGS. 3A, 3B and 4 below.

The processing unit 102 can be, for example, any suitable general purpose microprocessor (e.g., a general purpose microprocessor from Intel, Motorola, or AMD). Although one processing unit 102 is illustrated in FIG. 1, the present invention can be implemented using more than one processing unit if desired. Alternatively, one or more field programmable gate arrays (FPGA) programmed to carry out the approaches described below can be used. Alternatively, one or more specialized circuits designed to carry out the approaches described below can be used. The memory 101 can be any suitable memory for storing a computer program (e.g., solid-state memory, optical memory, magnetic memory, etc.). In addition, any suitable combination of hardware, software and firmware can be used to carry out the approaches described herein.

As illustrated in FIG. 1, the system 100 can be viewed as having various functional attributes, which can be implemented via the processing unit 102 which accesses the memory 101. For example, the system 100 can include a whole-pixel aligner 103 that can receive image data from an image-data source. The image-data source can be any suitable source for providing image data. For example, the image-data source can be a memory or other storage device having image data stored therein. Alternatively, for example, the image-data source can be a camera or any type of image sensor that can provide image data corresponding to imagery in any desired wavelength range. For example, the image data can correspond to infrared (IR) imagery, visible-wavelength imagery, or imagery corresponding to other wavelength ranges. In one exemplary aspect, the image-data source can be an infrared camera coupled to a frame-to-frame internal stabilizer mounted on an airborne platform. For example, the system 100 can be used as a missile tracker for tracking a missile to be directed to a targeted object identified using a separate target tracker. Any suitable target tracker can be used in this regard.

The whole-pixel aligner 103 can receive first image data corresponding to a first image and second image data corresponding to a second image and can then register the first image data and the second image data to each other such that the first image and the second image are aligned to within one pixel of each other. In other words, the whole-pixel aligner 103 can align the first and second image data such that common background features present in both the first image and second image are aligned at the whole-pixel (integer-pixel) level. Where it is known in advance that the first and second image data will be received already aligned at the whole-pixel level, the whole-pixel aligner 103 can be bypassed or eliminated.

If the whole-pixel aligner 103 is utilized, whole-pixel alignment can be done by a variety of techniques. One simple approach is to difference the first and second image data at a plurality of predetermined whole-pixel offsets (displacements) and determine which offset produced a minimum residue found by calculating a sum-total-pixel value of each of the difference data corresponding to each particular offset. For example, a portion (window) of the first image can be selected, and the data encompassed by the window can be shifted by a first predetermined whole-pixel offset. A pixel-by-pixel difference can then be generated between the shifted data and corresponding unshifted data of the second image. The references to "first" and "second" in this regard are merely labels to distinguish data corresponding to different images and do not necessarily reflect a temporal order. The sum-total-pixel value of the difference data thereby obtained can be calculated, and the shifting and differencing can be repeated a desired number of times with a plurality of predetermined whole-pixel offsets. The sum-total-pixel values corresponding to each shift can then be compared, and the shift that produces the lowest sum-total-pixel value in the difference data can be chosen as the shift that produces the desired whole-pixel alignment. All of the image data corresponding to the image being shifted can then be shifted by the optimum whole-pixel displacement thereby determined.

In the above-described whole-pixel alignment approach, it is typically sufficient to use a window size of 1% or less of the total image. For example, a 9×9 pixel window can be used for a 256×256 pixel image size. Of course, larger window sizes, or a full image of any suitable size, can also be used.

The range of whole-pixel offsets utilized for whole-pixel alignment can be specified based on the nature of the image data obtained. For example, it may be known in view of mechanical and electrical considerations involving the image sensor (e.g., whether or not image stabilization is provided, or how quickly a field of view is scanned) that the field of view for the first image data and the second image data will not differ by more than a certain number of pixels in the x and y directions. In such a case, it is merely necessary to investigate whole-pixel offsets within that range.

In another exemplary approach for whole-pixel alignment, a method of steepest descent can be used to make more selective choices for a subsequent pixel displacement in view of difference data obtained corresponding to previous pixel displacements. Applying a method of steepest descent in this regard is within the purview of one of ordinary skill in the art and does not require further discussion.

As another alternative, where the target of interest is clearly identifiable from the images obtained (e.g., a missile that is substantially bright) any suitable tracker algorithm can be used to align first and second image data at the whole-pixel level. In addition, any other suitable approach for aligning two images at the whole-pixel level can be used for whole-pixel alignment.

In view of the exemplary whole-pixel alignment described above, it will be apparent to those skilled in the art that some amount of image contrast in each of the first and second image is necessary to accomplish the alignment. Where it is known in advance that sufficient image contrast is present throughout each image, the position of the window can be arbitrary and can be selected in any convenient manner (e.g., a predetermined position). Where there is a possibility that substantial portions of each of the first and second images may contain little or no contrast, any conventional algorithm for detecting regions of contrast in the image can be used to select a position for the window.

As shown in FIG. 1, the system 100 can also include an image enhancer 104. The image enhancer 104 can be, for example, a high-pass filter, a low-pass filter, a band-pass filter, or any other suitable mechanism for enhancing an image. In addition, the placement of the image enhancer 104 can be varied. For example, the image enhancer can be located functionally prior to the whole-pixel aligner 103 or after the dual sub-pixel shifter/interpolation/differencer 106. Also, image enhancement is not necessarily required, and the image enhancer 104 can be eliminated or bypassed if desired.

As shown in FIG. 1, the system 100 comprises a dual sub-pixel shifter/interpolater/differencer (DSPD) 106 that receives first image data corresponding to a first image and second image corresponding to a second image, wherein pixels of the first image data and pixels of the second image data are registered to each other. In this regard "registered" refers to the first image data and the second image data being aligned at the whole-pixel level, such as can be accomplished using the whole-pixel aligner 103 as described above. As noted above, if the first image data and the second image data are known to already be registered to within one pixel of each other directly from the image-data source, it is not necessary to provide a whole-pixel aligner 103. The DSPD 106 is used to shift at least a portion of the first image data by a first fractional pixel displacement and at least a portion of the second image data by a second fractional pixel displacement to generate first shifted data and second shifted data, respectively. Approaches for choosing suitable first and second fractional pixel displacements for aligning the first and second image data at the sub-pixel level will be described below.

Figure 2:
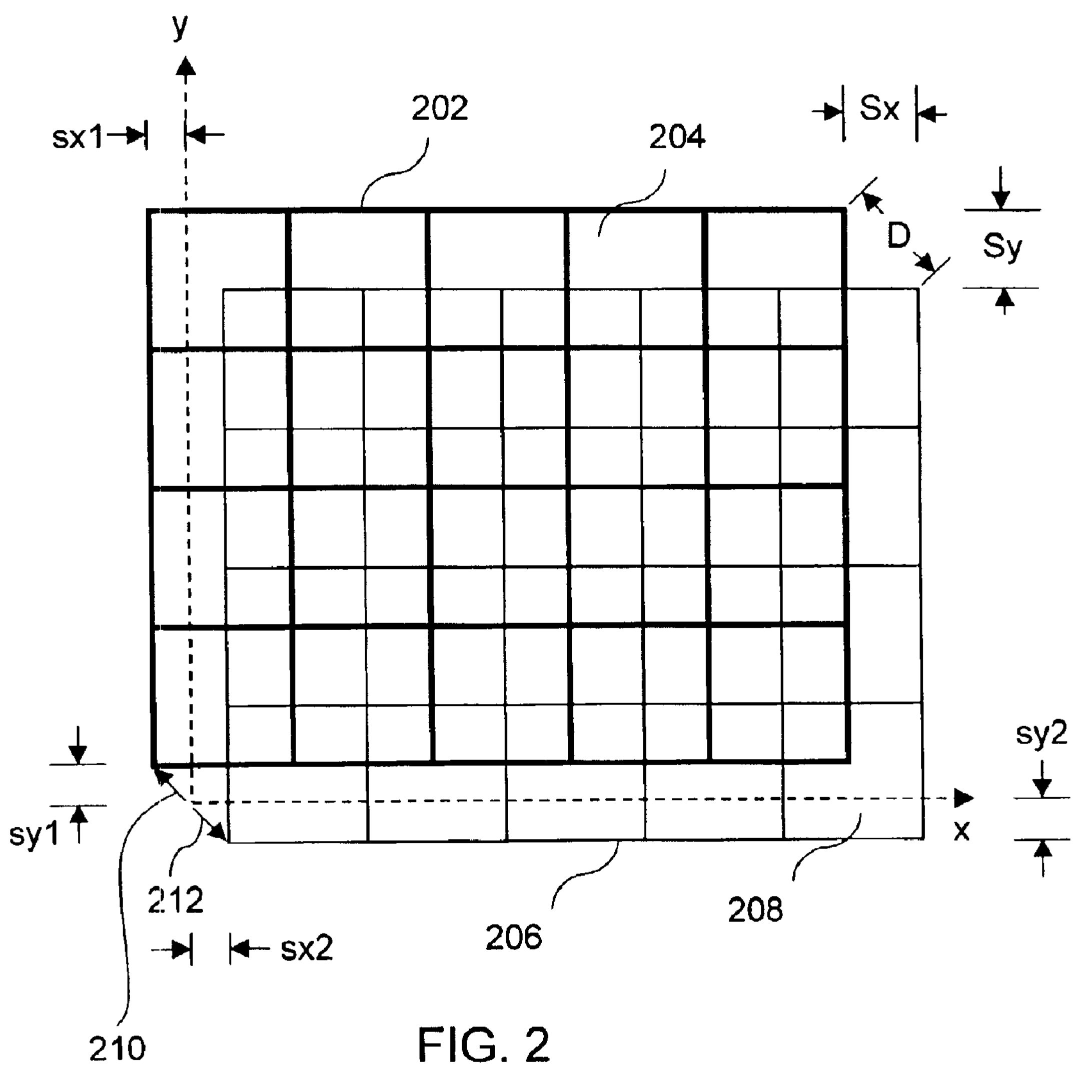
FIG. 2 is a schematic illustration of shifting a first image and a second image according to an exemplary aspect of the present invention.

An exemplary approach for shifting at least a portion of the first image data by a first fractional pixel displacement and at least a portion of the second image data by a second fractional pixel displacement is illustrated schematically in FIG. 2. As shown in FIG. 2, a first image 202 comprises a plurality of pixels 204. In addition, a second image 206 comprises a plurality of pixels 208. As shown in FIG. 2, both the first image 202 and the second image 206 are shifted relative to x-y coordinate axes. The first image 202 is shifted by a first fractional pixel displacement 210 (a first vector shift). The first fractional pixel displacement 210 has an x-component of sx1 in the x direction and a y-component of sy1 in the y direction. In the particular example of FIG. 2, sx1 is negative and sy1 is positive, but sx1 and sy1 are not limited to these selections. In addition, the second image 206 is shifted by a second fractional pixel displacement 212 (a second vector shift). The second fractional pixel displacement 212 has an x-component of sx2 in the x direction and a y-component of sy2 in the y direction. In the particular example of FIG. 2, sx2 is positive, and sy2 is negative, but sx2 and sy2 are not limited these selections. Also, as illustrated in FIG. 2, the first fractional pixel displacement 210 can be directed in a direction opposite to the second fractional pixel displacement 212. In addition, as illustrated in the example of FIG. 2, the magnitude of the first fractional pixel displacement 210 can be equal to the magnitude of the second fractional pixel displacement 212. Thus, a total relative shift between the first image 202 and the second image 206 is given by the relative distance D as illustrated in FIG. 2 with components Sx in the x direction and Sy in the y direction.

In the particular example of FIG. 2, the first fractional pixel displacement 210 is shown as being equal in magnitude and opposite in direction to the second fractional pixel displacement 212. However, the magnitudes and directions of the first and second fractional pixel displacements 210 and 212 are not restricted to this relationship. For example, the first fractional pixel displacement 210 can be opposite in direction to the second pixel displacement 212 in a manner such that the magnitudes of the first and second fractional pixel displacements 210 and 212 differ. For example, instead of the first and second fractional pixel displacements 210 and 212 each having a magnitude of ½ D, the first fractional pixel displacement could be chosen as ¼ D, and the second fractional pixel displacement could be chosen as ¾D. Generally, where the first fractional pixel displacement 210 is opposite in direction to the second fractional pixel displacement 212 the first fractional pixel displacement can be chosen to have a magnitude of $\alpha$D, and the second fractional pixel displacement can be chosen to have the magnitude $(1-\alpha)$D, where $\alpha$ is a number greater than 0 and less than 1.

In addition, in the example of FIG. 2, both the first image 202 and the second image 206 are shifted in both the x direction and the y direction. However, it is not required that both the first image and the second image be shifted in both the x direction and the y direction. For example, the first image 202 could be shifted in solely the x direction, if desired, and the second image 206 could be shifted in solely the y direction, or vice versa. Moreover, it is possible to shift both the first and second images 202 and 206 in solely the x direction. Alternatively, it is possible to shift both the first and second images 202 and 206 in solely the y direction. In view of the above, it will be recognized that many variations of the shifting the first and second images 202 and 206 are possible. Additional details on how the first fractional pixel displacement and the second fractional pixel displacement can be chosen will be described below in relation to an exemplary aspect of the invention.

The DSPD 106 also interpolates the first shifted data and the second shifted data to generate first interpolated data and second interpolated data, respectively. In this regard, any suitable interpolation approach can be used to interpolate the first shifted data and the second shifted data. For example, the first shifted data and the second shifted data can be interpolated using bilinear interpolation known to those skilled in the art. Bilinear interpolation is discussed for example, in U.S. Pat. No. 5,801,678, the entire contents of which are expressly incorporated herein by reference. Other types of interpolation methods that can be used include, for example, bicubic interpolation, cubic-spline interpolation, and dual-quadratic interpolation. However, the interpolation is not limited to these choices.

In addition, the DSPD 106 is used for differencing the first interpolated data and the second interpolated data to generate residue data. In this regard, "differencing" can comprise executing a subtraction between corresponding pixels of the first interpolated data and the second interpolated data—that is, subtracting the first interpolated data from the second interpolated data or subtracting the second interpolated data from the first interpolated data. Differencing can also include executing another function on the subtracted data. For example, differencing can also include taking an absolute value of each pixel value of the subtracted data or squaring each pixel value of the subtracted data.

The residue image data output from the DSPD 106 can then be analyzed by the target identifier 108 to identify one or more moving objects from the residue image data. Such moving objects can be referred to as targets for convenience but should not be confused with a targeted object that can be separately identified using separate target tracker if the present invention is used as a missile tracker. The residue image data output from the DSPD 106 can typically comprise a "dipole" feature that corresponds to the target—that is, an image feature having positive pixel values and corresponding negative pixel values displaced slightly from the positive pixel values. The positive and negative pixel values of the dipole feature together correspond to a target that has moved slightly from one position to another position corresponding to the times when the first image data and the second image data were taken. The remainder of the residue image data typically comprises a flat-contrast background because other stationary background features of the first and second image data have been subtracted away as a result of the shifting, interpolating and differencing steps. Of course, if the moving target has moved behind a background feature of the background imagery in either of the frames of the first and second image data, a dipole feature will not be observed. Rather, either a positive image feature or a negative image feature will be observed in such a case.

The target identification can be accomplished by any suitable target-identification algorithm or peak-detection algorithm. Conventional algorithms are known in the art and require no further discussion. In addition, the expected dipole signature of a moving target can also be exploited for use in target detection if desired. Once the target is identified, it can be desirable to also detect the centroid of the target using any suitable method. In this regard, if a dipole image feature is present in the residue image, it is merely necessary to determine the centroid of the portion of the dipole that occurs later in time. Also, or alternatively, it can be desirable to outline the target using any suitable outline algorithm. Conventional algorithms are known to those skilled in the art. Target detection is optional, and the target identifier 108 can be bypassed or eliminated if desired.

Moreover, with regard to target identification, it is possible and sometimes desirable to generate an accumulated residue image wherein consecutive residue images obtained from multiple frames of imagery are summed to assist with the detection of targets with particularly weak intensities.

After the target has been identified, the target information from the residue image data can be transformed using a coordinate converter 110 to convert the target position information back to any desired reference coordinates. For example, if the system 100 is being used as a missile tracker for tracking a missile being directed to a targeted object, the missile position information determined by the system 100 can be converted to an inertial reference frame corresponding to the field of view of the missile tracking image sensor. Any suitable algorithms for carrying out coordinate conversion can be used. Conventional algorithms are known to those skilled in the art and do not require further discussion here. After executing a coordinate conversion, the resulting converted data can be output to any desired type of device, such as any recording medium and/or any type of image display. Such coordinate conversion is optional, and the coordinate converter 110 can be eliminated or bypassed if desired. If target identification is not utilized, the residue image data can be converted to reference coordinates if desired.

An advantage of the system 100 compared to conventional image processing systems is that, in the system 100, at least a portion of the first image data and at least a portion of the second image data both undergo sub-pixel shifting and interpolation. In contrast, conventional systems that carry out sub-pixel alignment merely shift and interpolate one of two images used for differencing rather than both images as described here. Given that most interpolation or re-sampling schemes either lose information or introduce artifacts, conventional approaches for sub-pixel alignment introduce unwanted artifacts into the residue image. This is because conventional approaches take the difference of an interpolated image and a non-interpolated image. The present invention avoids this problem because both images are shifted and interpolated. Thus, any filtering or any artifacts introduced by the interpolation occur in both images that are used for differencing. Thus, both the first and second images contain spatial information of similar frequency content as modified by the interpolation process. Thus, when two images are differenced according to the present invention, they are both filtered or modified during the interpolation process so that the residue image will not contain extraneous information caused by the interpolation process. Because a cleaner residue image is produced, the present invention allows for a more accurate null point analysis (target detection). Thus, because the residue image is cleaner, the present invention allows for more accurate target detection from residue images. For example, the present invention allows a sub-pixel image-based missile tracker to track more accurately using the present approach.

Figure 3A:
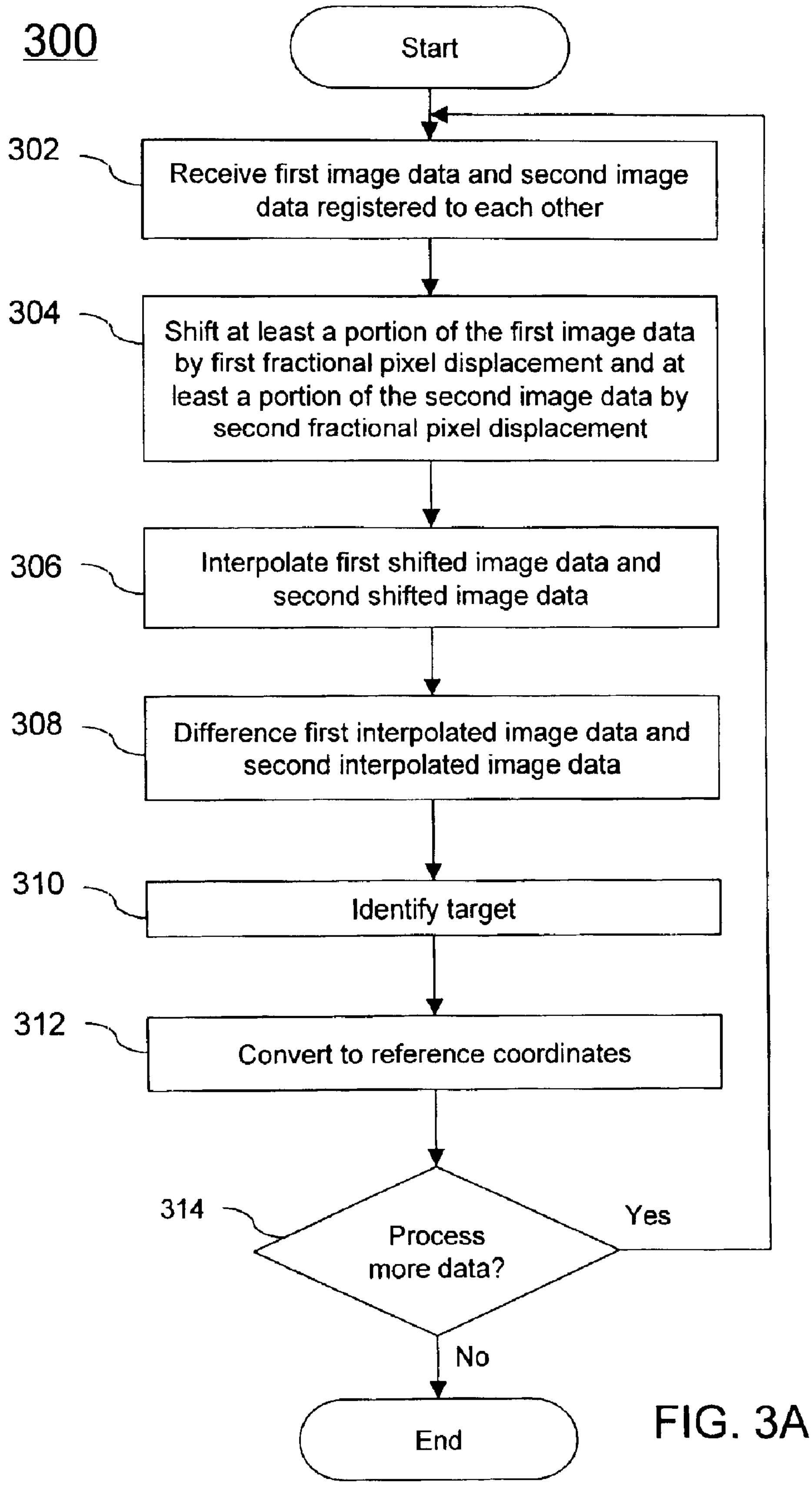
FIG. 3A is a flow diagram of a method of processing image data according to an exemplary aspect of the present invention.
Figure 3B:
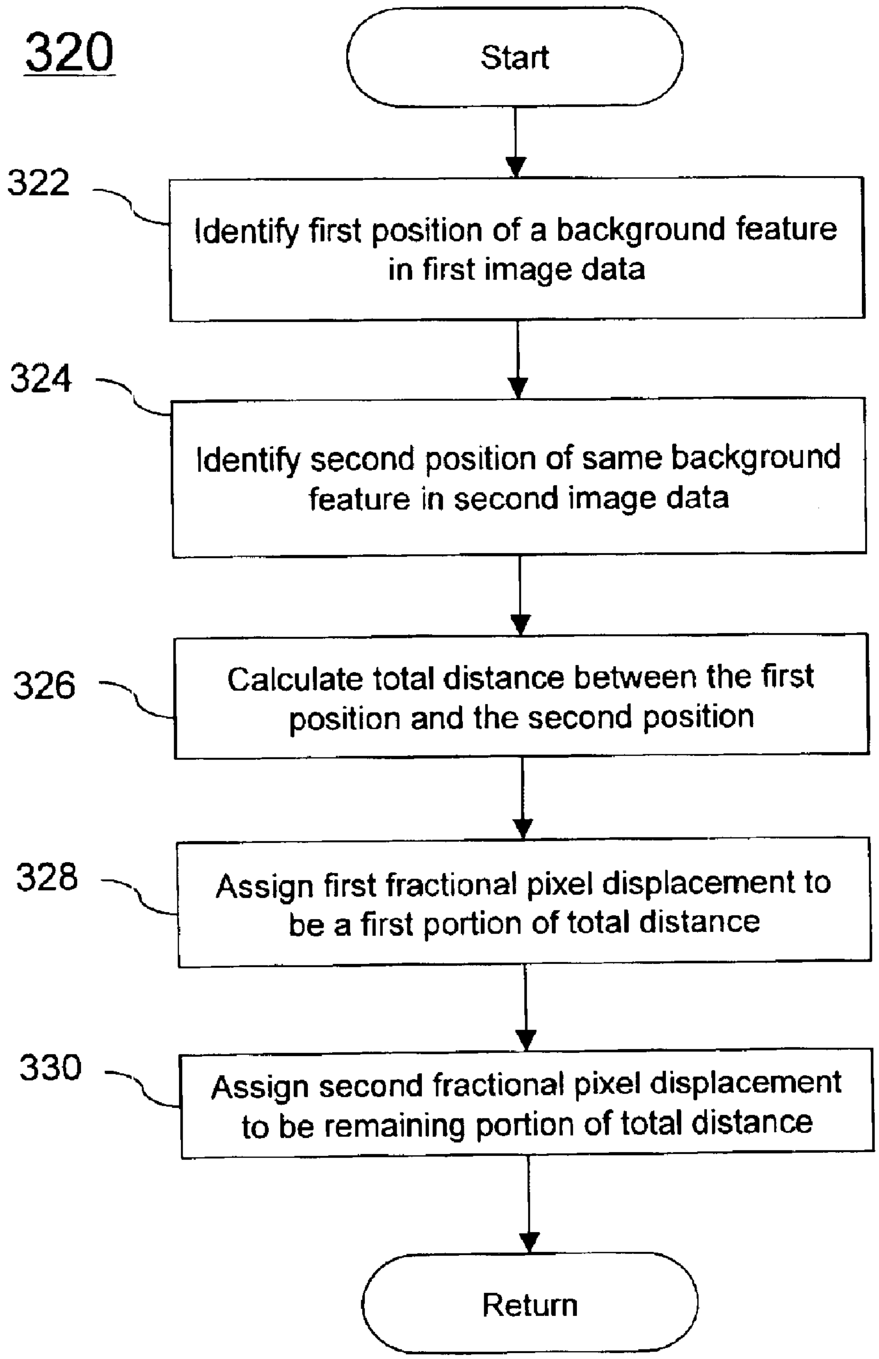
FIG. 3B is a flow diagram of an exemplary approach for determining first and second fractional pixel displacements that can be used in conjunction with the exemplary method illustrated in FIG. 3A.

Additional exemplary details regarding approaches for image processing according to the present invention will now be described with reference to FIGS. 3A, 3B and 4.

In another aspect of the invention there is provided a method of processing image data. An exemplary method 300 of processing image data is illustrated in the flow diagram of FIG. 3A. As shown at step 302, the method 300 comprises receiving first image data corresponding to a first image and second image data corresponding to a second image, wherein pixels of the first image data and pixels of the second image data are registered to each other. In this regard, "registered" means that the background imagery or the fields of view of the first and second images are aligned to each other at the whole-pixel level—that is, the first and second images are aligned to within one pixel of each other. The first image data and the second image data can be received in this registered configuration directly from an image-data source, or the first image data and the second image data can be received in this registered state from a whole pixel aligner, such as the whole-pixel aligner 103 illustrated in FIG. 1. As shown at step 304, the method also comprises shifting at least a portion of the first image data by a first fractional pixel displacement and at least a portion of the second image data by a second fractional displacement to generate first shifted data and second shifted data, respectively. The first image data and the second image data (or portions thereof) can be shifted in any of the manners previously described in the discussion pertaining to FIG. 2 above.

In an exemplary aspect, the first fractional pixel displacement and the second fractional pixel displacement can be determined using a common background feature present in both the first and second image data corresponding to the first and second images. An exemplary approach 320 for determining the first and second fractional pixel displacements is illustrated in the flow diagram of FIG. 3B. As illustrated in FIG. 3B, the approach 320 comprises identifying a first position of a background feature in the first image data (step 322) and identifying a second position of the same background feature in the second image data (step 324). For example, any suitable peak detection algorithm, such as conventional peak-detection algorithms known to those skilled in the art, can be used to identify an appropriate background feature. Any suitable peak fitting routine, such as conventional routines known to those skilled in the art, can then be used to fit a functional form to the feature in both the first image data and the second image data. It will be recognized that such routines can provide sub-pixel resolution of a peak centroid even where the fitted feature itself spans several pixels or more. In addition, this exemplary approach for determining the first and second fractional pixel displacements can be carried out using the first and second image data in their entirety or using portions (windows) of the first and second image data. For example, window sizes of 1% or less of the total image can be used. Of course, larger window sizes can also be used. Where windows are used, the position of the window can be arbitrary and can be selected in any convenient manner (e.g., a predetermined position) if it is known that sufficient image contrast will be available throughout the first and second images. Where there is a possibility that substantial portions of each of the first and second images may contain little or no contrast, any conventional algorithm for detecting regions of contrast in the images can be used to select a position for the window.

After the first position and the second position of the background feature are identified in the first image data and the second image data, a total distance between the first position and the second position can be calculated (step 326). The first fractional pixel displacement can then be assigned to be a portion of the total distance thus determined (step 328), and the second fractional pixel displacement can be assigned to be a remaining portion of the total distance such that, when combined, the first fractional pixel displacement and the second fractional pixel displacement yield the total distance (step 330). The first fractional pixel displacement and the second fractional pixel displacement can be assigned in any manner such as previously described with regard to FIG. 2. For example, the second fractional pixel displacement can be opposite in direction to the first fractional pixel displacement. That is, the second fractional pixel displacement can be oriented parallel to the first fractional pixel displacement but in an opposite direction. Alternatively, the first fractional pixel displacement and the second fractional pixel displacement can be oriented in a non-parallel manner. For example, the first fractional pixel displacement can be directed along the x direction whereas the second fractional pixel displacement can be directed along the y direction. In addition, the second fractional pixel displacement can be equal in magnitude to the first fractional pixel displacement. However, the magnitudes of the first and second fractional pixel displacements are not restricted to the selection and can be chosen in any manner such as described above with regard to FIG. 2.

Returning to FIG. 3A, the method 300 further comprises interpolating the first shifted data and the second shifted data to generate first interpolated data and second interpolated data, respectively (step 306). As noted above, any suitable interpolation technique can be used to carry out the interpolations. Exemplary interpolation schemes include, but are not limited to, bilinear interpolation, bicubic interpolation, cubic-spline interpolation, and dual-quadratic interpolation to name a few.

As indicated at step 308, the method 300 also comprises differencing the first interpolated data and the second interpolated data to generate residue data. In this regard, differencing can comprise a simple subtraction of one of the first and second interpolated data from the other. Alternatively, differencing can comprise subtracting as well as taking an absolute value of the subtracted data or squaring the subtracted data.

As noted at step 310, the method 300 can also comprise identifying target data from the residue data. As noted above in the discussion with regard to FIG. 1, in cases where a moving target is present in both the first image data and the second image data, the moving target can appear in the residue image data as a dipole feature having a region of positive pixel values and a region of negative pixel values. This characteristic signature can be utilized to assist in target identification. Alternatively, any suitable target-identification algorithm or peak-detection algorithm can be utilized to identify the positive and/or negative pixel features associated with the moving target.

As indicated at step 312, the method 300 can also include converting the position information of the identified target to reference coordinates. For example, as noted above, the target position information can be converted to an inertial reference frame corresponding to a field of view of an image sensor that provides the first and second image data. Any suitable approach for coordinate conversion can be used. Conventional coordinate-conversion approaches are known to those skilled in the art and do not require further discussion.

As indicated at step 314, the method 300 can also comprise a decision step wherein it is determined whether more data should be processed. If the answer is yes, the process can begin again at step 302. If no further data should be processed, the algorithm ends.

In another exemplary aspect of the invention, an iterative process can be used to determine ultimate values for the first fractional pixel displacement and the second fractional pixel displacement. An exemplary image processing method 400 incorporating an iterative approach is illustrated in the flow diagram of FIG. 4. The method 400 includes a receiving step 402, a shifting step 404, and an interpolating step 406 that correspond to steps 302, 304 and 306 of FIG. 3A, respectively. Accordingly, no additional discussion of these steps is necessary. In addition, as indicated at step 408, the method 400 comprises combining the first interpolated data and the second interpolated data to generate resultant data. In an exemplary aspect, combining the first interpolated data and the second interpolated data can comprise subtracting the first interpolated data from the second interpolated data or vice versa to generate difference data and forming an absolute value of each pixel value of difference data. In an alternative aspect, combining the first interpolated data and the second interpolated data can comprise subtracting the first interpolated data from the second interpolated data or vice versa to generate difference data and squaring each pixel value of the difference data. In another alternative aspect, combining the first interpolated data and the second interpolated data can comprise multiplying the first interpolated data and the second interpolated data pixel-by-pixel.

As indicated at step 410, the method 400 can also comprise comparing resultant data from different iterations of steps 404–408. Although step 410 is illustrated in the example of FIG. 4 as occurring within an iterative loop defined by the decision step 412, step 410 could alternatively occur after step 412, after a plurality of resultant data have already been generated. In an exemplary aspect, comparing different resultant data from different iterations can comprise comparing sum-total-pixel values for two or more resultant data.

Once resultant data from different iterations have been compared, either within the iteration loop or after iterations have been completed, the method 400 can further comprise, at step 414, selecting one of a plurality of first interpolated data and one of a plurality of second interpolated data generated during the iterations to be the first interpolated data and the second interpolated data respectively used for differencing in step 416. The selection can be based upon the above-noted comparing at step 410. Step 416, which comprises differencing the selected first interpolated data and second interpolated data to generate residue data, corresponds to step 308 of FIG. 3A, and no further discussion of step 416 is necessary.

In addition, the method 400 can also comprise identifying target data from the residue data at step 418, converting position information of the target data to reference coordinates at step 420, and determining whether or not to process additional data at step 422. In this regard, steps 418, 420, and 422 correspond to steps 310, 312 and 314 of FIG. 3A. Accordingly, no further discussion of steps 418, 420 and 422 is necessary.

Exemplary approaches for carrying out the iterations involving steps 404, 406, 408 and optionally step 410 to thereby determine ultimate values for the first and second fractional pixel displacements will now be described.

In one exemplary approach, steps 404–410 are repeated iteratively using a plurality of predetermined first fractional pixel displacements and a plurality of predetermined second fractional pixel displacements. In addition, an additional step can be provided after step 402 and prior to step 404 wherein the first image data and the second image data (or portions thereof) are combined (such as indicated at step 408) without any shift or interpolation as a starting point for comparison in step 410. Steps 404–410 are repeated using a plurality of predetermined combinations of the first fractional pixel displacement and the second fractional pixel displacement. A result of the comparison step 410 can be monitored and continuously updated to provide an indication of which combination of a given first fractional pixel displacement and a given second fractional pixel displacement provides the lowest sum-total-pixel value of the resultant data from step 408. For example, a set of fifteen relative fractional pixel displacements and a zero relative displacement (for comparison purposes) can be chosen (i.e., sixteen sets of data for comparison). For convenience, the relative fractional pixel displacements can be specified by component values Sx and Sy described previously and as illustrated in FIG. 2. An exemplary selection of sixteen combinations of Sx and Sy (including zero relative shift) is (0, 0), (0, ¼), (0, ½), (0, ¾), (¼, 0), (¼, ¼), . . . , (¾, ¾). Here, each pixel is assumed to have a unit dimension in both the x and y directions (i.e., the pixel has a width of 1 in each direction). Of course, it should be noted that these displacements are relative displacements and that both the first image data and the second image data are shifted to yield these relative displacements. Also, the first image data and the second image data can be shifted in any manner such as discussed with regard to FIG. 2 that achieves these relative fractional pixel displacements. In addition, it should be noted that a difference can be performed between the first image data and the second image data with no relative shift whatsoever for comparison purposes (i.e., Sx=0 and Sy=0). Of course, this example involving fifteen relative pixel displacements is exemplary in nature and not intended to be limiting. Based on such appropriate predetermined fractional pixel displacements, the remaining steps 414–422 can be carried out such as described above. Moreover, it should be noted that the step of combining (step 408) can include various approaches for combining the first and second interpolated data—differencing and taking the absolute value, differencing and squaring, or multiplying pixel-by-pixel.

Figure 4:
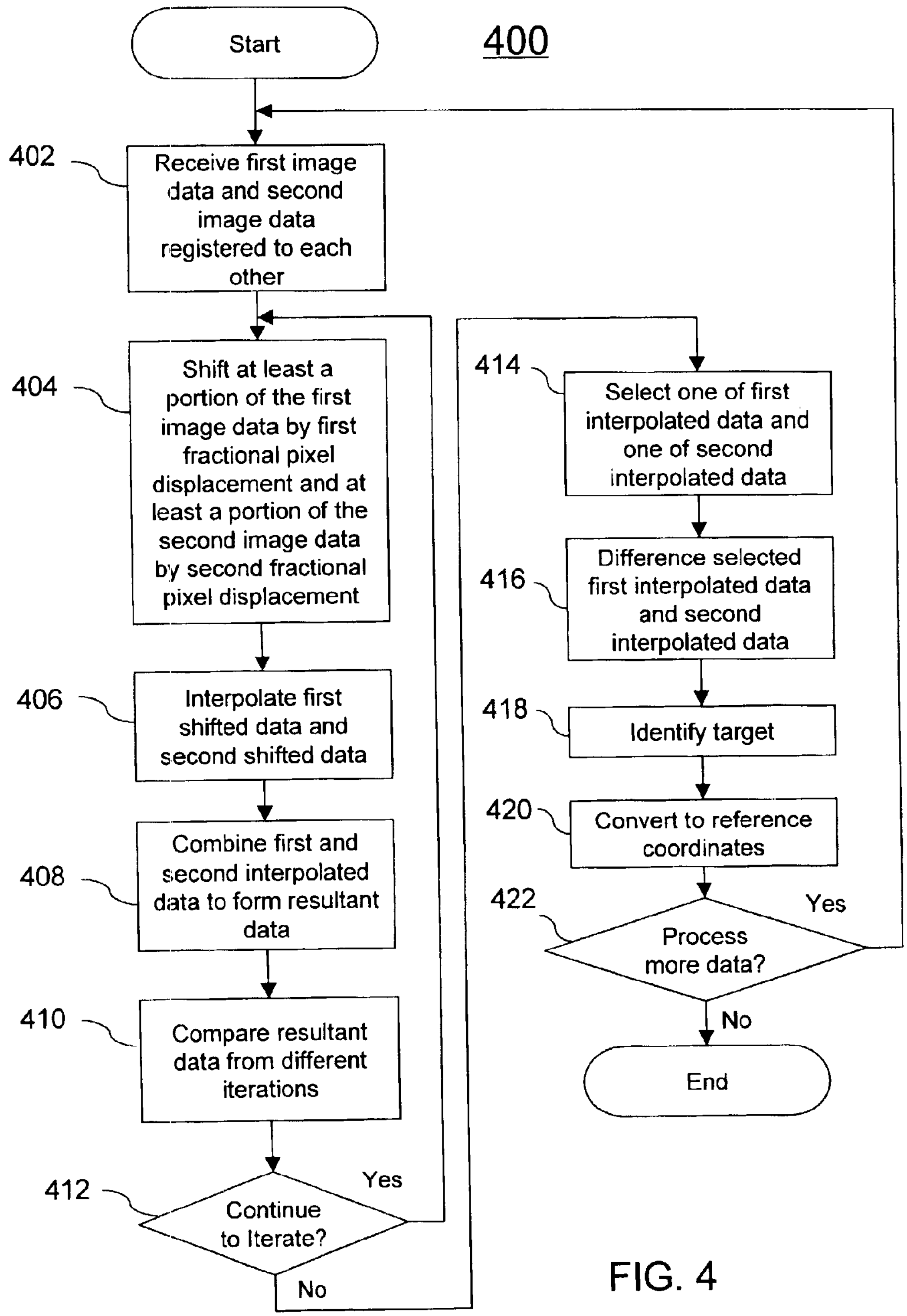
FIG. 4 is a flow diagram of a method of processing image data according to an exemplary aspect of the present invention.

In another exemplary approach for carrying out the iteration of steps 404–410 shown in FIG. 4, a divide-and-conquer approach can be utilized wherein pixels of the first and second image data are effectively divided into quadrants for sub-pixel alignment purposes, and a best quadrant-to-quadrant alignment is determined from an analysis of the four possible alignments of such quadrants. In other words, relative fractional displacements can be set at zero or one-half of a pixel dimension in each direction to find a best quadrant-to-quadrant alignment (also called a best point) using a minimum residue criteria based on comparing sum-total-pixel values of combined first and second interpolated data. In this approach, a step can be performed prior to step 404 wherein neither the first image data nor the second image data (or portions thereof) are shifted; rather, first and second image data can be simply combined such as set forth in step 408 to determine a first sum-total-pixel value.

Next, the first image data (or a portion thereof of a given size) and the second image data (or a portion thereof of the same given size) are each shifted to achieve a relative pixel displacement of one-half pixel in the y direction. This can be accomplished by shifting the first image data for example by one-quarter pixel in the positive y direction and by shifting the second image data by one-quarter pixel in the negative y direction (step 404). Both the first shifted image data and the second shifted image data are then interpolated (step 406), and the first interpolated data and the second interpolated data are combined (step 408). A second sum-total-pixel value can be generated from this resultant data and compared (step 410) to the first sum-total-pixel value obtained with no shift.

Next, the first image data (or the portion thereof of the given size) and the second image data (or the portion thereof of the given size) can each be shifted to achieve a relative fractional pixel displacement of one-half pixel in the x direction. For example, the first image data (or the portion thereof) can be shifted by one-quarter pixel in the positive x direction, and the second image data (or the portion thereof) can be shifted by one-quarter pixel in the negative x direction (step 404). Then, the first shifted image data and the second shifted image data from this iteration can be interpolated (step 406). The first interpolated data and the second interpolated data can then be combined to form resultant data (step 408). A third sum-total-pixel value can then be generated from this resultant data and compared to the smaller of the first and second sum-total-pixel values (step 410).

Next, the first image data (or the portion thereof) and the second image data (or the portion thereof) can be shifted to achieve a relative displacement of $\sqrt{2}/2$ in the 45° diagonal direction between the x and y directions. For example, the first image data (or the portion thereof) can be shifted by one-quarter pixel in both the positive x direction and the positive y direction, and the second image data (or the portion thereof) can be shifted by one-quarter pixel in both the negative x direction and the negative y direction (step 404). This first and second shifted image data can then be interpolated and combined as shown in steps 406 and 408. A fourth sum-total-pixel value can be generated from the resultant data determined at step 408 during this iteration, and the fourth sum-total-pixel value can be compared to the smaller of the first, second and third sum-total-pixel values determined previously (step 410). The result of this comparison step then determines which of the three relative image shifts and the unshifted data provides the lowest sum-total-pixel value (i.e., the minimum residue). Whichever relative fractional pixel displacement (or no shift at all) provides the lowest residue is then accepted as a first approximation for achieving sub-pixel alignment of the first image data and the second image data.

This first approximation for achieving sub-pixel alignment of the first image data and the second image data (this first best point) can then be used as the starting point to repeat the above-described iterative process at an even finer level wherein a quadrant of each pixel of the first and second image data (or portions thereof) is further divided into four quadrants (ie., sub-quadrants), and the best point is again found using the approach described above applied to the sub-quadrants. This approach can be repeated as many times as desired, but typically two or three iterations is sufficient to determine a highly aligned pair of images. For example, with regard to step 412, it can be specified at the outset that only two or three iterations of the above-described divide-and-conquer approach will be executed. Alternatively, the decision at step 412 can be made based upon whether or not a sum-total-pixel value of resultant data is less than a predetermined amount that can be set based upon experience and testing. When it is determined at step 412 that no further iterations are necessary, the remaining steps 414–422 can be carried out as described previously. Of course, in the above-described approach, it should be noted that the comparison step 410 can alternatively be carried out at the end of a set of iterations rather than during each iterative step.

In the approaches described above, the shifting, interpolating, and differencing can be carried out using portions (windows) of the first and second image data or using the first and second image data in their entirety. In either case, the shifting can result in edge pixels of the first image data (or portion thereof) being misaligned with edge pixels of the second image data (or portion thereof). Such edge pixels can be ignored and eliminated from the process of interpolating and differencing. The processes of interpolating and differencing as used herein are intended to include the possibility of ignoring edge pixels in this manner. Moreover, if the shifting, interpolating and differencing described above are carried out using portions (windows) of the first and second data, a final shift, a final interpolation and a final difference can be carried out on the first and second image data in their entirety after ultimate values of the first and second fractional pixel displacements have been determined to provide residue image data of full size if desired.

In addition, if windows are used to determine the ultimate first and second fractional pixel displacements, the position of the windows can be arbitrary and can be selected in any convenient manner (e.g., a predetermined position) if it is known that sufficient image contrast will be available throughout the first and second images. Where there is a possibility that substantial portions of each of the first and second images may contain little or no contrast, any conventional algorithm for detecting regions of contrast in the images can be used to select a position for the window. Windows of 1% or less of the total image size can be sufficient for determining the ultimate first and second fractional pixel displacements. Of course, larger windows can also be used.

In another exemplary aspect of the present invention, there is provided a computer-readable carrier containing a computer program adapted to program a computer to execute approaches for image processing as described above. In this regard, the computer-readable carrier can be, for example, solid-state memory, magnetic memory such as a magnetic disk, optical memory such as an optical disk, a modulated wave (such as radio frequency, audio frequency or optical frequency modulated waves), or a modulated downloadable bit stream that can be received by a computer via a network or a via a wireless connection.

It should be noted that the terms "comprises" and "comprising", when used in this specification, are taken to specify the presence of stated features, integers, steps or components; but the use of these terms does not preclude the presence or addition of one or more other features, integers, steps, components or groups thereof.

The invention has been described with reference to particular embodiments. However, it will be readily apparent to those skilled in the art that it is possible to embody the invention in specific forms other than those of the embodiments described above. This can be done without departing from the spirit of the invention. For example, in the above-described exemplary divide-and-conquer approach, it is possible to shift and interpolate only one of the first and second image data during the iterative process to determine an ultimate relative fractional pixel displacement for ultimate sub-pixel alignment. Then, a final shift and interpolation of both the first and second image data can be done such that the sum of the first and second fractional pixel displacements is equal to the ultimate relative fractional pixel displacement. In addition, the magnitudes of the first and second fractional pixel displacements can differ from particular exemplary displacements described above. Further, the approaches described above can be applied to data of any dimensionality (e.g., one-dimensional, two-dimensional, three-dimensional, and higher mathematical dimensions) and are not restricted to two-dimensional image data.

The embodiments described herein are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of processing image data, comprising:

receiving first image data corresponding to a first image and second image data corresponding to a second image, wherein pixels of the first image data and pixels of the second image data are registered to each other;

shifting at least a portion of the first image data by a first fractional pixel displacement and at least a portion of the second image data by a second fractional pixel displacement to generate first shifted data and second shifted data, respectively;

interpolating the first shifted data and the second shifted data to generate first interpolated data and second interpolated data, respectively; and differencing the first interpolated data and the second interpolated data to generate residue data.

2. The method of claim 1, comprising:

identifying target data from the residue data.

3. The method of claim 1, wherein said interpolating the first shifted data and the second shifted data utilizes bilinear interpolation.

4. The method of claim 1, wherein the second fractional pixel displacement is opposite in direction to the first fractional pixel displacement.

5. The method of claim 4, wherein the second fractional pixel displacement is equal in magnitude to the first fractional pixel displacement.

6. The method of claim 1, comprising determining the first fractional pixel displacement and the second fractional pixel displacement by:

identifying a first position of a background feature in the first image data, identifying a second position of said background feature in the second image data, calculating a total distance between the first position and the second position, assigning the first fractional pixel displacement to be a portion of the total distance, and assigning the second fractional pixel displacement to be a remaining portion of the total distance such that a combination of the first fractional pixel displacement and the second fractional pixel displacement yields the total distance.

7. The method of claim 6, wherein the second fractional pixel distance displacement is opposite in direction to the first fractional pixel displacement.

8. The method of claim 7, wherein the second fractional pixel displacement is equal in magnitude to the first fractional pixel displacement.

9. The method of claim 8, wherein said interpolating the first shifted data and the second shifted data utilizes bilinear interpolation.

10. The method of claim 9, comprising:

identifying target data from the residue data.

11. The method of claim 1, comprising:

combining the first interpolated data and the second interpolated data to generate resultant data;

repeating, one or more times, said shifting, said interpolating, and said combining using a different quantity for at least one of the first fractional pixel displacement and the second fractional pixel displacement for each iteration of said repeating;

comparing resultant data from different iterations of said repeating; and selecting one of a plurality of first interpolated data and one of a plurality of the second interpolated data generated during said iterations to be the first interpolated data and the second interpolated data used for said differencing, wherein the selecting is based upon the comparing.

12. The method of claim 11, wherein combining the first interpolated data and the second interpolated data comprises:

subtracting the first interpolated data from the second interpolated data or vice versa to generate difference data; and forming an absolute value of each pixel value of difference data.

13. The method of claim 11, wherein combining the first interpolated data and the second interpolated data comprises:

subtracting the first interpolated data from the second interpolated data or vice versa to generate difference data; and squaring each pixel value of the difference data.

14. The method of claim 11, wherein combining first interpolated data and the second interpolated data comprises:

multiplying the first interpolated data and the second interpolated data pixel-by-pixel.

15. The method of claim 11, wherein said comparing comprises comparing sum-total-pixel values for a plurality of resultant data generated during said iterations.

16. The method of claim 15, wherein said selecting comprises choosing one of the plurality of first interpolated data and one of the plurality of second interpolated data corresponding to one of the plurality of resultant data with a lowest sum-total-pixel value.

17. The method of claim 11, wherein a given choice for the first fractional pixel displacement is opposite in direction to a given choice for the second fractional pixel displacement for a given iteration of said repeating.

18. The method of claim 17, wherein said given choice for the first fractional pixel displacement is equal in magnitude to said given choice for the second fractional pixel displacement for said given iteration of said repeating.

19. The method of claim 18, wherein said interpolating the first shifted data and the second shifted data utilizes bilinear interpolation.

20. The method of claim 19, comprising:

identifying target data from the residue data.

21. An image processing system, comprising:

a memory; and a processing unit coupled to the memory, wherein the processing unit is configured to execute steps of receiving first image data corresponding to a first image and second image data corresponding to a second image, wherein pixels of the first image data and pixels of the second image data are registered to each other, shifting at least a portion of the first image data by a first fractional pixel displacement and at least a portion of the second image data by a second fractional pixel displacement to generate first shifted image data and second shifted image data, respectively, interpolating the first shifted image data and the second shifted image data to generate first interpolated image data and second interpolated image data, respectively, and differencing the first interpolated image data and the second interpolated image data to generate residue image data.

22. The image processing system of claim 21, wherein the processing unit is configured to identify target data from the residue data.

23. The image processing system of claim 21, wherein said interpolating the first shifted data and the second shifted data utilizes bilinear interpolation.

24. The image processing system of claim 21, wherein the second fractional pixel displacement is opposite in direction to the first fractional pixel displacement.

25. The image processing system of claim 24, wherein the second fractional pixel displacement is equal in magnitude to the first fractional pixel displacement.

26. The image processing system of claim 21, wherein the processing unit is configured to determine the first fractional pixel displacement and the second fractional pixel displacement by:

identifying a first position of a background feature in the first image data;

identifying a second position of said background feature in the second image data;

calculating a total distance between the first position and the second position;

assigning the first fractional pixel displacement to be a portion of the total distance; and assigning the second fractional pixel displacement to be a remaining portion of the total distance such that a combination of the first fractional pixel displacement and the second fractional pixel displacement yields the total distance.

27. The image processing system of claim 26, wherein the second fractional pixel displacement is opposite in direction to the first fractional pixel displacement.

28. The image processing system of claim 27, wherein the second fractional pixel displacement is equal in magnitude to the first fractional pixel displacement.

29. The image processing system of claim 28, wherein bilinear interpolation is used to interpolate the first shifted data and the second shifted data.

30. The image processing system of claim 29, wherein the processing unit is configured to identify target data from the residue data.

31. The image processing system of claim 21, wherein the processing unit is configured to execute steps of:

combining the first interpolated data and the second interpolated data to generate resultant data;

repeating, one or more times, said shifting, said interpolating, and said combining using a different quantity for at least one of the first fractional pixel displacement and the second fractional pixel displacement for each iteration of said repeating;

comparing resultant data from different iterations of said repeating; and selecting one of a plurality of first interpolated data and one of a plurality of the second interpolated data generated during said iterations to be the first interpolated data and the second interpolated data used for said differencing, wherein the selecting is based upon the comparing.

32. The image processing system of claim 31, wherein combining the first interpolated data and the second interpolated data comprises:

subtracting the first interpolated data from the second interpolated data or vice versa to generate difference data; and forming an absolute value of each pixel value of difference data.

33. The image processing system of claim 31, wherein combining the first interpolated data and the second interpolated data comprises:

subtracting the first interpolated data from the second interpolated data or vice versa to generate difference data; and squaring each pixel value of the difference data.

34. The image processing system of claim 31, wherein combining first interpolated data and the second interpolated data comprises:

multiplying the first interpolated data and the second interpolated data pixel-by-pixel.

35. The image processing system of claim 31, wherein said comparing comprises comparing sum-total-pixel values for a plurality of resultant data generated during said iterations.

36. The image processing system of claim 35, wherein said selecting comprises choosing one of the plurality of first interpolated data and one of the plurality of second interpolated data corresponding to one of the plurality of resultant data with a lowest sum-total-pixel value.

37. The image processing system of claim 31, wherein a given choice for the first fractional pixel displacement is opposite in direction to a given choice for the second fractional pixel displacement for a given iteration of said repeating.

38. The image processing system of claim 37, wherein said given choice for the first fractional pixel displacement is equal in magnitude to said given choice for the second fractional pixel displacement for said given iteration of said repeating.

39. The image processing system of claim 38, wherein said interpolating the first shifted data and the second shifted data utilizes bilinear interpolation.

40. The image processing system of claim 39, wherein the processing unit is configured to identify target data from the residue data.

41. A computer-readable carrier adapted to program a computer to execute steps of:

receiving first image data corresponding to a first image and second image data corresponding to a second image, wherein pixels of the first image data and pixels of the second image data are registered to each other;

shifting at least a portion of the first image data by a first fractional pixel displacement and at least a portion of the second image data by a second fractional pixel displacement to generate first shifted image data and second shifted image data, respectively;

interpolating the first shifted image data and the second shifted image data to generate first interpolated image data and second interpolated image data, respectively; and differencing the first interpolated image data and the second interpolated image data to generate residue image data.

42. The computer readable carrier of claim 41, wherein the computer-readable carrier is adapted to program the computer to identify target data from the residue data.

43. The computer readable carrier of claim 41, wherein said interpolating the first shifted data and the second shifted data utilizes bilinear interpolation.

44. The computer readable carrier of claim 41, wherein the second fractional pixel displacement is opposite in direction to the first fractional pixel displacement.

45. The computer-readable carrier of claim 44, wherein the second fractional pixel displacement is equal in magnitude to the first fractional pixel displacement.

46. The computer readable carrier of claim 41, wherein the computer-readable carrier is adapted to program the computer to determine the first fractional pixel displacement and the second fractional pixel displacement by:

identifying a first position of a background feature in the first image data;

identifying a second position of said background feature in the second image data;

calculating a total distance between the first position and the second position;

assigning the first fractional pixel displacement to be a portion of the total distance; and assigning the second fractional pixel displacement to be a remaining portion of the total distance such that a combination of the first fractional pixel displacement and the second fractional pixel displacement yields the total distance.

47. The computer readable carrier of claim 46, wherein the second fractional pixel displacement is opposite in direction to the first fractional pixel displacement.

48. The computer readable carrier of claim 47, wherein the second fractional pixel displacement is equal in magnitude to the first fractional pixel displacement.

49. The computer readable carrier of claim 48, wherein said interpolating the first shifted data and the second shifted data utilizes bilinear interpolation.

50. The computer-readable carrier of claim 49, wherein the computer-readable carrier is adapted to program the computer identify target data from the residue data.

51. The computer-readable carrier of claim 41, wherein the computer-readable carrier is adapted to program the computer to execute steps of:

combining the first interpolated data and the second interpolated data to generate resultant data;

repeating, one or more times, said shifting, said interpolating, and said combining using a different quantity for at least one of the first fractional pixel displacement and the second fractional pixel displacement for each iteration of said repeating;

comparing resultant data from different iterations of said repeating; and selecting one of a plurality of first interpolated data and one of a plurality of the second interpolated data generated during said iterations, to be the first interpolated data and the second interpolated data used for said differencing, wherein the selecting is based upon the comparing.

52. The computer-readable carrier of claim 51, wherein combining the first interpolated data and the second interpolated data comprises:

subtracting the first interpolated data from the second interpolated data or vice versa to generate difference data; and forming an absolute value of each pixel value of difference data.

53. The computer-readable carrier of claim 51, wherein combining the first interpolated data and the second interpolated data comprises:

subtracting the first interpolated data from the second interpolated data or vice versa to generate difference data; and squaring each pixel value of the difference data.

54. The computer-readable carrier of claim 51, wherein combining first interpolated data and the second interpolated data comprises:

multiplying the first interpolated data and the second interpolated data pixel-by-pixel.

55. The computer-readable carrier of claim 51, wherein said comparing comprises comparing sum-total-pixel values for a plurality of resultant data generated during said iterations.

56. The computer-readable carrier of claim 55, wherein said selecting comprises choosing one of the plurality of first interpolated data and one of the plurality of second interpolated data corresponding to one of the plurality of resultant data with a lowest sum-total-pixel value.

57. The computer-readable carrier of claim 51, wherein a given choice for the first fractional pixel displacement is opposite in direction to a given choice for the second fractional pixel displacement for a given iteration of said repeating.

58. The computer-readable carrier of claim 57, wherein said given choice for the first fractional pixel displacement is equal in magnitude to said given choice for the second fractional pixel displacement for said given iteration of said repeating.

59. The computer-readable carrier of claim 58, wherein said interpolating the first shifted data and the second shifted data utilizes bilinear interpolation.

60. The computer-readable carrier of claim 59, wherein the computer-readable carrier is adapted to program the computer to identify target data from the residue data.

* * * * *